United States Patent [19]

Masegi

[11] 4,387,983
[45] Jun. 14, 1983

[54] SCAN TYPE IMAGE RECORDING APPARATUS

[75] Inventor: Koichi Masegi, Yokohama, Japan

[73] Assignee: Canon Kabushiki Kaisha, Tokyo, Japan

[21] Appl. No.: 165,139

[22] Filed: Jul. 1, 1980

[30] Foreign Application Priority Data

Jul. 3, 1979 [JP] Japan .................................. 54/84180
Jun. 19, 1980 [JP] Japan .................................. 54/83066

[51] Int. Cl.³ ...................... G03G 15/28; G01D 15/14
[52] U.S. Cl. ..................................... 355/8; 355/14 E; 219/121 LB; 346/76 L; 358/300
[58] Field of Search ..................... 178/6.6 A; 358/300; 219/121 LA, 121 LB, 121 LW; 355/8, 14 C, 14 E; 346/76 L, 108, 160

[56] References Cited

U.S. PATENT DOCUMENTS 3,484,791 12/1969 Saeger et al. ..................... 358/300 X
4,001,840 1/1977 Becker et al. ............ 219/121 LW X
4,060,323 11/1977 Hirayama et al. ............. 346/76 L X
4,201,994 5/1980 Hoshito et al. .................. 346/160 X
4,233,612 11/1980 Hirayama et al. .................. 346/160
4,251,821 2/1981 Kimura .............................. 346/108
4,257,701 3/1981 Hirayama et al. ..................... 355/8
4,361,394 11/1982 Sakai et al. ......................... 355/8 X

*Primary Examiner*—G. Z. Rubinson
*Assistant Examiner*—Keith E. George
*Attorney, Agent, or Firm*—Fitzpatrick, Cella, Harper & Scinto

[57] ABSTRACT

There is disclosed a scanning type of image recording apparatus in which information recording is performed by scanning a photosensitive medium with a beam of light modulated by a modulation signal. Recording signals having one level are enlarged in signal width to obtain the modulation signal, thereby to avoid undesirable thinning of a recorded image. Thus, it is possible to achieve recording exactly corresponding to the recording signals.

15 Claims, 34 Drawing Figures

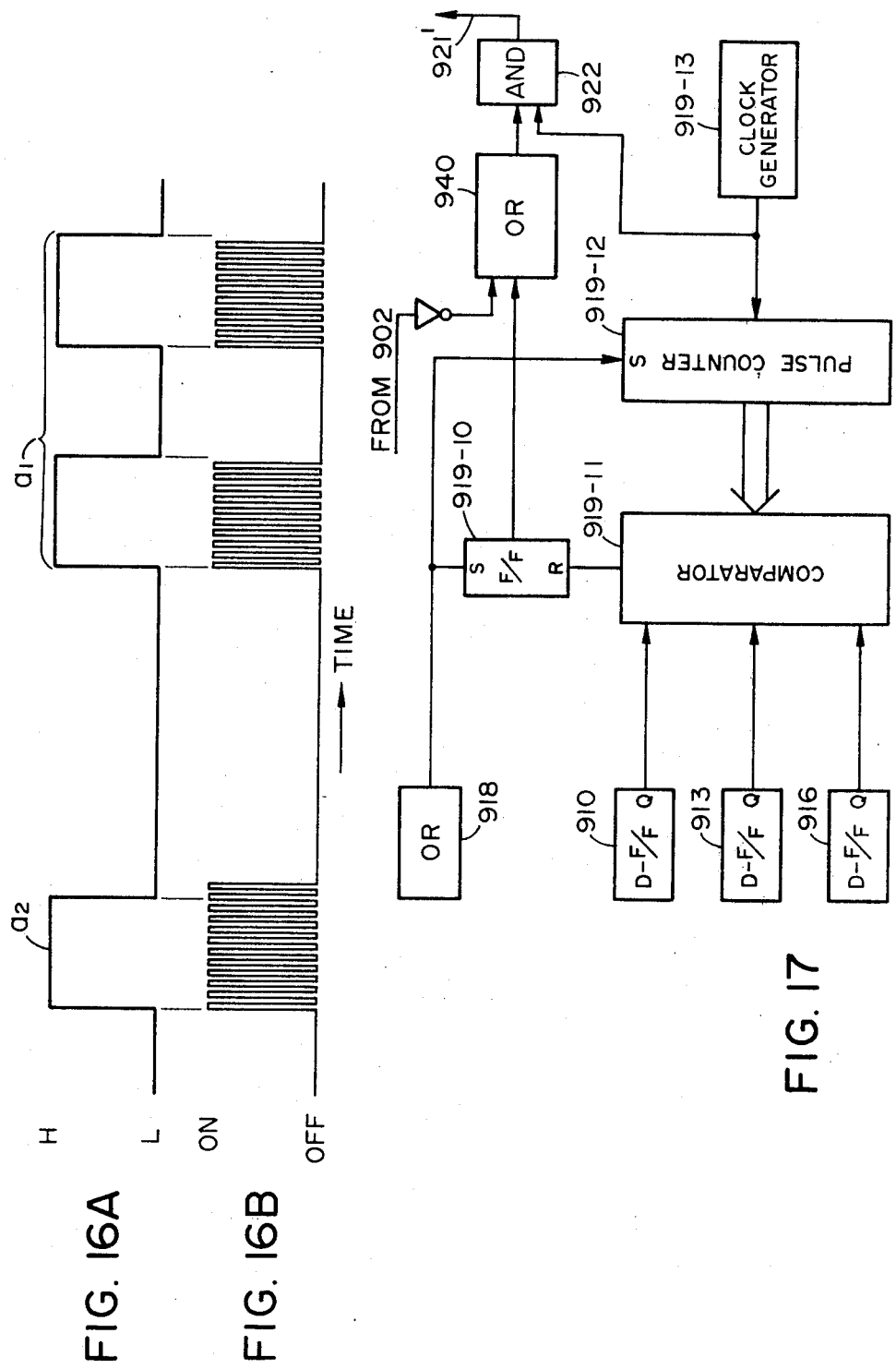

SCAN TYPE IMAGE RECORDING APPARATUS

BACKGROUND OF THE INVENTION

1. Field of the Invention

The present invention relates to a scan type image recording apparatus in which images are produced on a recording medium by a scanning light beam in accordance with information signals.

2. Description of the Prior Art

Recording apparatus has been developed and is known in the art in which a beam of light is modulated in accordance with image information coming from an electronic computer or the like. The modulated beam is focused on a recording medium while scanning through optical elements such as a light deflecting device and a lens to effect recording of the image information.

The known image recording apparatus mentioned above has a problem which is attributable to the type of developing process used in the invention. For example, two developing processes may be compared. One is of the type in which those portions not exposed to the light beam are visualized and the other is of the type in which exposed portions are visualized. Compared with the latter mentioned developing process, the former has a problem. Namely, when the first mentioned type of developing process is employed, there occurs a phenomenon of so-called "thinning of image" (line becomes thinned or narrowed in the direction of beam scanning). This phenomenon of "thinning of image" will be described in detail with reference to FIGS. 1 to 4.

FIG. 1 shows a letter "T" formed by employing the second developing process (exposed part is developed). The width of line in the scanning direction is indicated by 101 at the beam portion of T and by 102 at the leg portion. In contrast, when the first mentioned developing process (unexposed part is developed) is employed, a T as shown in FIG. 2 is formed which has a line width of 201 at the beam portion and 202 at the leg portion. It is clearly seen that the widths, 201 and 202 are smaller than 101 and 102 respectively. This is the phenomenon of "thinning of image". Due to this unfavorable phenomenon, the image "T" obtained employing the first mentioned type of developing process is not good in quality as compared with that obtained by the second mentioned one.

The cause for this unfavorable phenomenon will be described in further detail with reference to FIG. 3.

In FIG. 3, a scanning line segment is analytically shown. When the second mentioned developing system (exposed part is developed) is employed, at the rising point 310 of an image (video) signal 300 there is produced a scanning spot at location 312 on the recording medium. The scanning spot continues running in the scanning direction indicated by arrow 314 during the time that the signal is On. At the time point 311 when the signal becomes Off, the scanning spot not at location 313 disappears. 315 designates the center line of a scanning line segment thus formed. The distribution of exposure along the center line 315 is shown at 302. At the area from one vertical edge 316 to the other vertical edge 318 of the scanning spot at location 312, the amount of exposure increases gradually. Then, the exposure continues to be constant until the spot enters the area between one vertical edge 319 and the other vertical edge 321 of the scanning spot at location 313. At this area between 319 and 321, the amount of exposure decreases gradually. The level of exposure at the centers 317 and 320 of the scanning spot location 312 and 313 is a half of a peak constant level. For this distribution of exposure 302, the exposed part above the developing level 322 is developed and other exposed parts under the developing level 322 can not be developed according to this type of developing process. Therefore, in this case the width of developed image is 323 which corresponds to the line width 101, 102 in FIG. 1.

When the first mentioned developing process (unexposed part is developed) is employed, images are formed by means of image signal 304 which is an inverted signal of the above-mentioned image signal 300. At the time point 350 when the image signal 304 becomes Off, the scanning spot reaches the spot location 352 and disappears. At the time pont 351, the signal becomes On and a scanning spot at location 353 is produced which runs in the scanning direction indicated by arrow 354. The scanning line section thus formed has its center line at 355. The distribution of exposure along the center line 355 is shown at 306. The amount of exposure decreases gradually at the area between one vertical edge 356 and the other vertical edge 358 of the scanning spot location 352. At 358, the exposure becomes zero and thereafter it continues to be zero until 359. At the area between one vertical edge 359 and the other vertical edge 361 of the scanning spot 353, the amount of exposure increases gradually and thereafter it is kept constant. The exposure level at the centers 357 and 360 of the scanning spot location 352 and 353 is half of the constant level. Let 362 be the developing level of the first mentioned type of developing process, then the exposed part under the developing level 362 and all of the unexposed area are developed. The remaining part can not be developed. Therefore, the width of the developed image becomes that indicated by 363 which corresponds to line width 201, 202 shown in FIG. 2.

For the reason described above, when the developing process of the type by which unexposed an part is developed is employed, the width of development becomes 363 in FIG. 3 (or 201, 202 in FIG. 2) which is shorter than 323 in FIG. 3 (or 101,102 in FIG. 1), namely the width of development by the second mentioned type of developing process (exposed part is developed). Thus, the phenomenon of "thinning of image" is caused. The image quality of "T" in FIG. 2 is reduced when compared with that in FIG. 1 accordingly.

The degree of "thinning of image" varies case by case. At the time of background exposure, when the case where unexposed portions concentrate in an area is compared with the case where an unexposed part stands isolated, these two cases represent different degrees of "thinning of image". Also, the degree of "thinning of image" varies depending upon the type of developing system then used. This will be described in detail with reference to FIG. 4.

FIG. 4A shows an original image or an image pattern to be recorded. The black part 400 comprises an isolated black portion 400a and densely concentrated black portions 400b. The width of each black portion is denoted by Wd and the width of white portion between two black portions 400b is denoted by We. In this connection, it should be understood that both of the widths Wd and We are in the order of 0.1 mm.

By reading the original image shown in FIG. 4A along the line indicated by arrow 403 using an image pick-up element, there can be obtained an electric signal 404 as shown in FIG. 4B. This electric signal 404 is used as a signal for modulating a laser beam. 405 indicates the laser beam incident upon a photosensitive medium. The abscissa in FIGS. 4C, D, E and F indicates the positions on the photosensitive medium in the principal scanning direction of the laser beam. According to the laser beam 405 there is formed on the photosensitive medium an electrostatic latent image as shown in FIG. 4D.

If the electrostatic latent image is developed by a developing agent of a dry two-component toner system composed of resin toner and iron powder carrier and using a magnet brush having no edge effect, then there is produced a developed image as shown in FIG. 4E. In this case, the thinning of image is uniform throughout the isolated black portion and the closely spaced black portions.

On the contrary, if the latent image is developed by using a single component toner projection developing system as disclosed in U.S. patent application Ser. No. 06/058,434 filed on July 18, 1979, then there is formed a developed image as shown in FIG. 4F. The degree of thinning of image of the isolated portion, in this case, is larger than that of the closely spaced black portions. This is attributable to the fact that in the toner projection development, the electric force lines at the edge port of a latent image are not directed to the developing electrode from the latent image, which leads to the phenomenon of thinning of image. At the inner side portion of the closely spaced black portions, this phenomenon can be lessened. However, at the isolated black portion, it becomes pronounced.

In summary, when the toner projection development is employed, the larger the white background area is, the larger the degree of thinning of image. The degree of the phenomenon "thinning of image" is therefore reduced with decrease of the area of the background.

SUMMARY OF THE INVENTION

Accordingly, it is an object of the invention to solve the problem of "thinning of image" mentioned above by altering the width of image signal.

It is a more specific object of the invention to provide a scan type image recording apparatus which produces high quality images employing a developing process and system of the type according to which unexposed parts are developed.

It is another object of the invention to provide such a scan type image recording apparatus in which the width of image signal is selectively changed depending upon whether black portions are present in an isolated form or in a closely spaced relation on the white background area so as to form high quality images.

Other and further objects, features and advantages of the invention will appear more fully from the following description taken in connection with the accompanying drawings.

BRIEF DESCRIPTION OF THE DRAWINGS

FIGS. 16A and 16B are timing charts of thickening processing as obtained when laser exposure is conducted;

FIG. 17 shows a circuit for obtaining the laser output shown in FIG. 16;

DESCRIPTION OF THE PREFERRED EMBODIMENT

Figure 5:
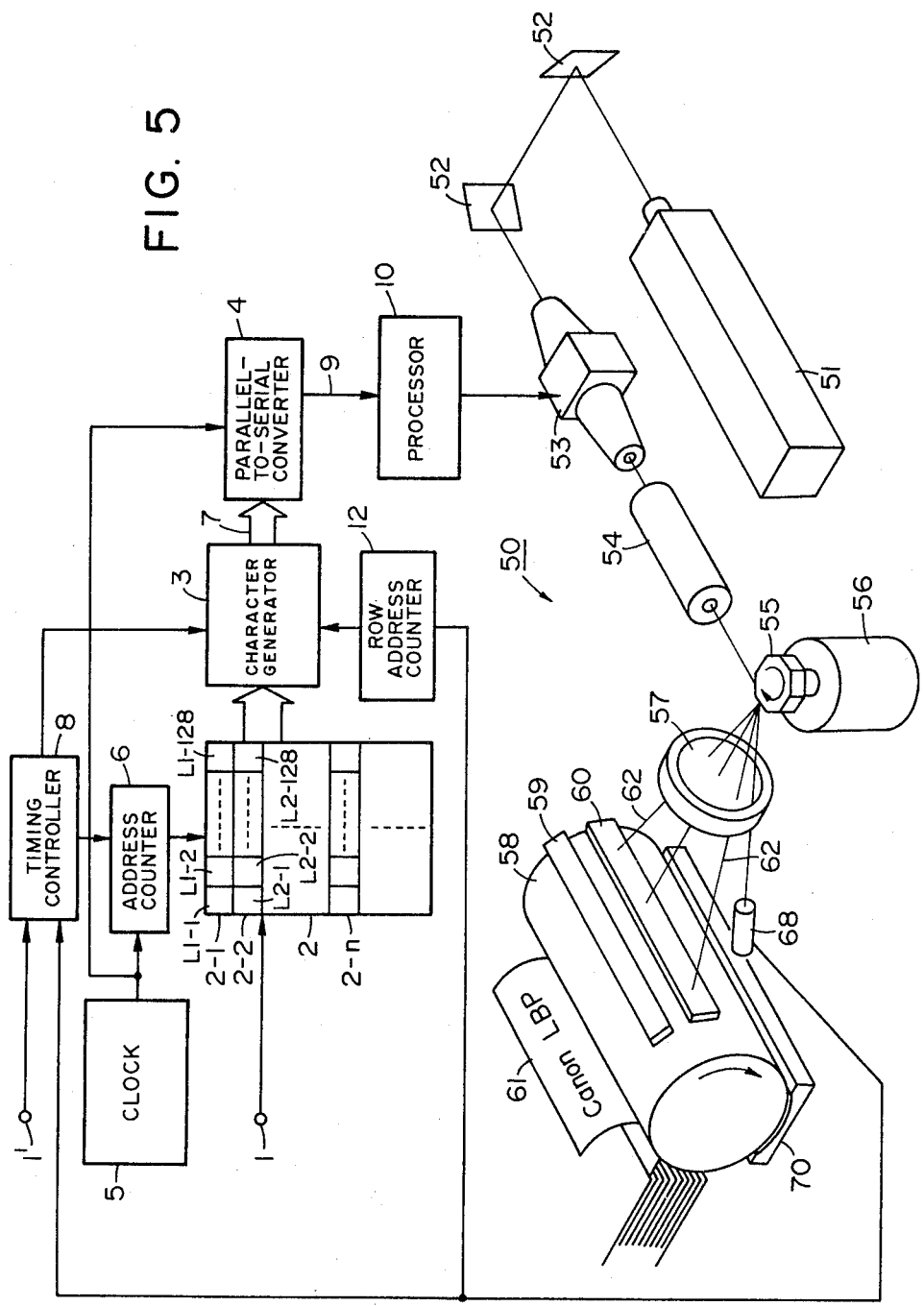
FIG. 5 shows a laser recording apparatus and modulating signal generating circuit associated therewith.

Referring first of FIG. 5 showing a scan type image recording apparatus including a modulating signal generating circuit, the reference number 1 designates a terminal for applying character code signals which are read out, for example, from a magnetic tape.

These character code signals applied from the terminal 1 are serially stored in a page memory 2. Assuming that the character code signal is of 8 bits per character, such character code signal is stored in an address determined by an address counter 6 by means of clocks from a clock generator 5. In the page memory 2, the character code signals are stored in the order of recording in such manner that character code signals of the first line in a page are stored in 2-1 area, those of the second line in 2-2 area and those of the n-th line are in 2-n area. For example, when the first line is composed of 128 characters, there are stored also 128 character code signals in each the area 2-1, 2-2, ... so on and the sections L1-1, L1-2, ... L1-128 of the first line contain each 8 bit character code signal stored therein. Upon the completion of writing in such signals for one page, an end signal is read in from a terminal 1' so that a timing controller 8 instructs the address counter 6 to start reading out. Thus, the address counter 6 starts reading out the signals.

Since, as previously described, the apparatus of this embodiment is a scan type recording apparatus, reading and recording are carried out in the following manner:

For the purpose of explanation, it is assumed that one character pattern is constituted of 32 scanning lines (rows).

At first, area 2-1 is read out serially from the section L1-1 to L1-128 to record the first row. Second, reading is carried out again starting from the section L1-1 up to the last section L1-128 serially to record the second row. In this manner, reading of the area 2-1 is repeated 32 times to complete recording of the first line by 32 rows. Then, reading is shifted to the next area 2-2. Therefore, the signal first read out by the address counter 6 is the first character code signal of the first line stored in the page memory 2. The first signal may be 8 bit code signal, 00001000. This code signal is first read out from the section L1-1 and applied to a character generator 3. As is well known in the art, the character generator 3 is so formed that when a character code signal and a row address signal for indicating the order that rows thereof are applied to the generator, it generates a dot signal corresponding to the indicated row of a character corresponding to the code signal. These dot signals are put out in parallel through an output line 7.

The row address signal mentioned above is formed by a row address counter 12 which counts beam detection signals coming from a beam detector 68 as later described. In the shown embodiment, one character pattern is stored in the character generator 3 as 32×32 dots and therefore the row address counter 12 is so formed as to return to its original position when 32 horizontal synchronizing signals are counted up.

The dot signals thus introduced into the output line 7 are converted to serial signals, for example, by such type of parallel-to-serial converter comprising shift registers 4. After being converted, the dot signals are introduced into a signal line 9 by means of shift pulse coming from the clock 5.

In the prior art apparatus, such serial signals on the signal line 9 were directly applied to a beam modulator 53 to modulate the beam. An important feature of the invention resides in that these serial signals are processed to change the signals by a processing circuit 10 of which description will be made later.

Now, the laser recording apparatus 50 will be described in detail.

A laser beam generated from a laser oscillator 51 is guided to a modulator by reflecting mirrors 52. The mirrors 52 are provided to curve the optical path thereby reducing the space required for the apparatus. Therefore, they are dispensable if unnecessary. The modulator 53 is of a known type and may be formed by using acousto-optical modulating elements having the known acousto-optical effect or electro-optical elements making use of the known electro-optical effect.

In the modulator 53, the laser beam is more or less modulated according to the input signal to the modulator.

The modulator 53 can be omitted and the laser beam can be led directly to a beam expander 54 when there is used, as the laser oscillator 51, a semiconductor laser, a gas laser of the type capable of modulating current or an internal modulating type of laser comprising a modulating element built into its oscillating optical path.

The beam expander 54 expands the beam diameter of the laser beam from the modulator 53 while maintaining the parallelism of rays of the beam. The diameter-expanded laser beam is directed to a rotary polygonal mirror 55 having one or more mirror surfaces. The rotary polygonal mirror 55 is mounted on a shaft supported by a bearing of high precision such as air bearing and is driven by a motor 56 rotating at a constant speed (such as hysteresis synchronous motor or DC servomotor). The laser beam 62 horizontally swept by the rotary polygonal mirror 55 is then focused as a spot on a photosensitive drum 58 through a known focusing lens 57 having f·θ characteristics. To detect the position of the laser beam 62 then swept there is provided a laser detector 68 which has an incidence slit and is composed of a photo-electric transducer element having a very short response time such as PIN diode. The detection signal is used to determine the timing of start of input signal to the modulator 53 for giving the photosensitive drum any desired information of light in good timing. This serves to minimize the problem caused by error of precision in dividing the reflecting surface of the rotary polygonal mirror 55 and by out of phase of signals in the horizontal direction due to possible irregularity of mirror rotation. Therefore, this arrangement produces images of high quality and also permits a wider range of allowance of accuracy required for the rotary polygonal mirror 55 and motor 56 which in turn serves to reduce the manufacturing cost thereof. As deflecting means there may be used other known mirrors such as a galvanomirror.

The photosensitive drum 58 comprises a top insulating layer, a photoconductive layer and an electrically conductive layer. The surface of the drum is positively charged uniformly by a primary charger 59 and then discharged at the exposed part by a discharger 60 (or AC or negatively charged) simultaneously with image-wise exposure to the laser beam. Thereafter, the electrostatic contrast is increased by using a full surface exposure lamp not shown.

Figure 6:
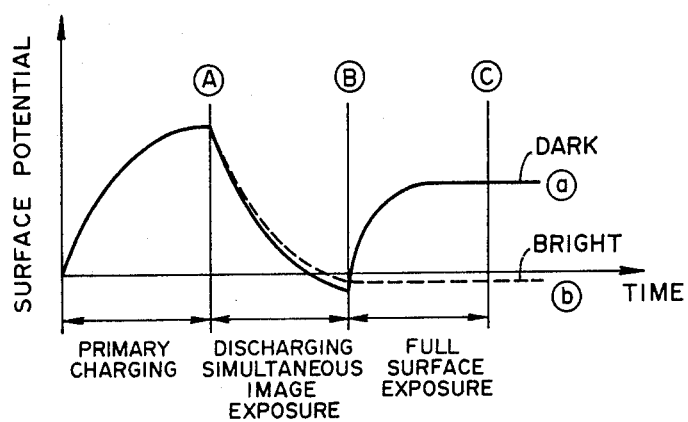
FIG. 6 is a curve showing change of surface potential with time on a photosensitive medium 58.

Surface potentials in the exposed part and unexposed part at the respective steps of the above process are shown in FIG. 6. As seen from the curves shown in FIG. 6, the potential actually contributable to development is that appearing at the point C. At this point C, the surface potential is plus at the unexposed part and minus at the exposed part of the photosensitive drum. Therefore, when the unexposed part is to be developed by the developing device 70, negatively charged toner (negative toner) is required. On the contrary, when the exposed part is to be developed, the developing device 70 contains positive toner.

The process to which the present invention is applicable is never limited to the above described process only. The invention is applicable also to so-called xerography or such other of types processes employing photosensitive papers.

Figure 7A:
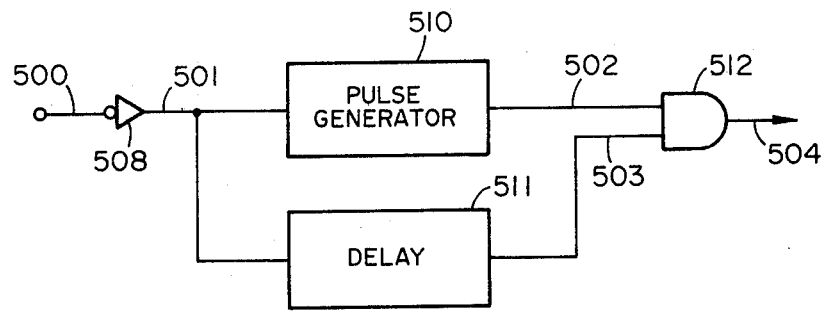
FIG. 7A is a circuit diagram showing a first embodiment of the processing circuit 10.
Figure 7B:
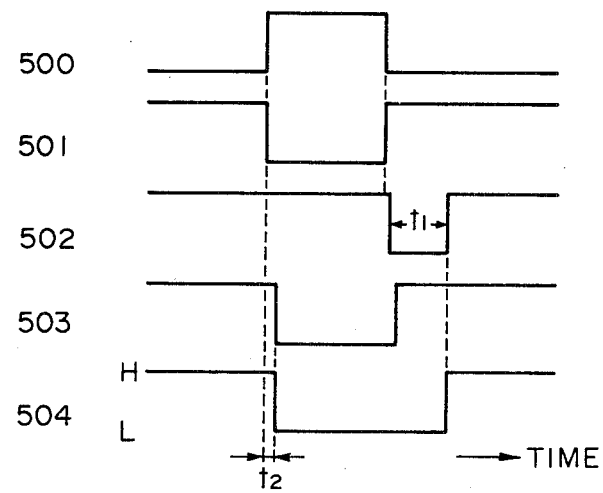
FIG. 7B shows wave-forms of signals at the respective parts thereof.

FIG. 7A shows one form of the above mentioned processor 10 for changing the pulse width of signal in the apparatus of the type in which the unexposed part is developed. The signal wave-forms at the respective parts of FIG. 7A are shown in FIG. 7B.

A serial input signal 500 is inverted by inverter 508 to produce an inverted signal 501 which is then introduced into pulse generator 510 and delay circuit 511. The pulse generator 510 generates a pulse having a determined time duration $t_1$ by rising of the inverted signal 501 to form a signal 502. The delay circuit 511 delays the inverted signal 501 by a time t₂ to form a signal 503. AND gate 512 receives the two signals 502 and 503 to form a modulated signal 504. The laser beam is projected on the photosensitive drum so long as the modulated signal 504 is at high level "H". During the time of the modulated signal being at low level "L", no laser beam is projected on the drum. Compared with the input signal 500, the modulated signal 504 is longer in pulse width by the time (t₁-t₂). Since the generation of pulse at the pulse generator 510 has a time lag, a short pulse is generated at the trailing end position of the original signal when AND of the signals 502 and the inverted signal 501 is taken up. Such a short pulse brings about a trouble in the formation of a so-called "beard" on the recording paper. The above delay circuit 511 is provided to prevent such a trouble. By using a signal 504 modulated from the input signal 500, the unfavourable phenomenon of "thinning of image" described above can be eliminated.

Figure 3:
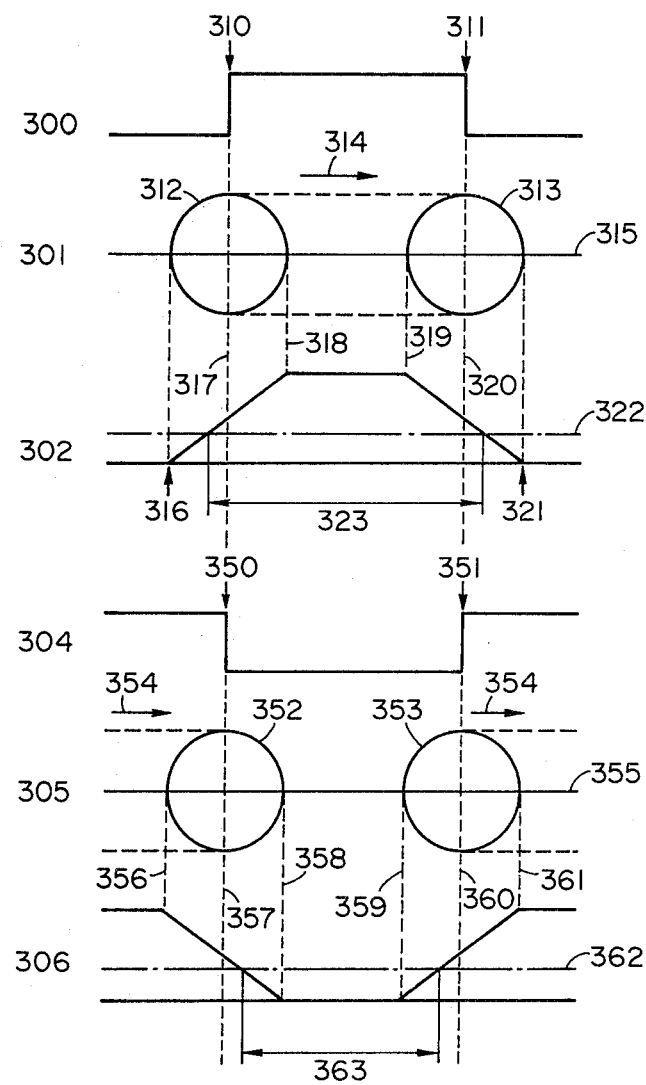
Figure 4:
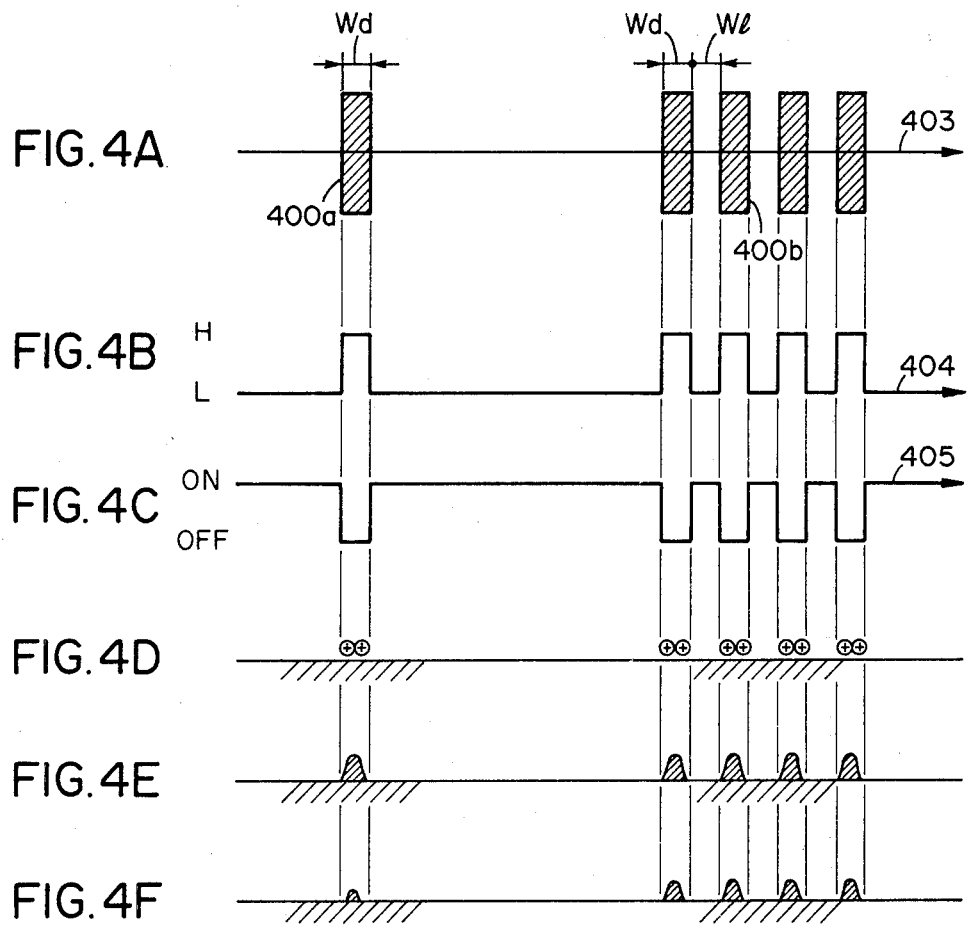
Figure 7C:
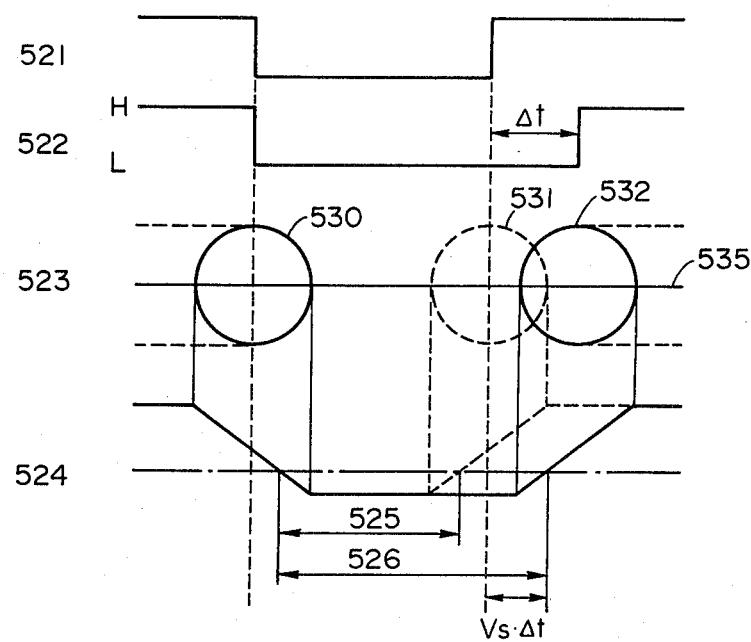
FIG. 7C shows the distribution of exposure and change of development width as obtained when pulse width is changed.
Figure 8A:
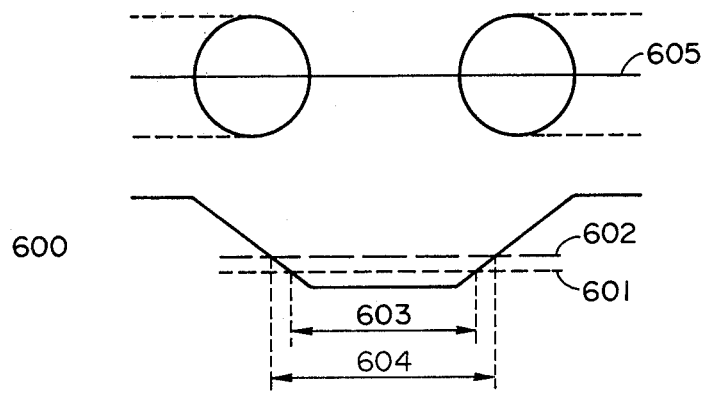
FIG. 8A shows the width of development as obtained when the developing level is changed.
Figure 8B:
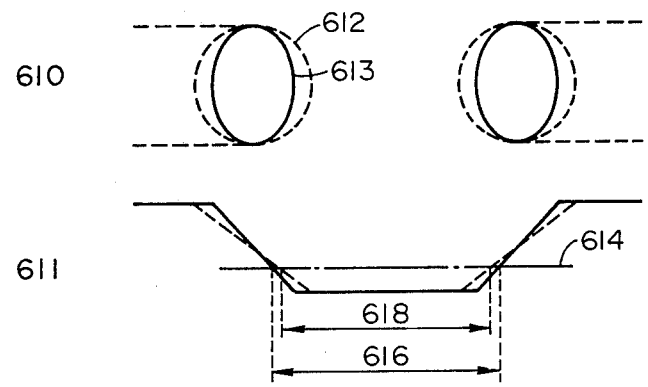
FIG. 8B shows the width of development as obtained when the beam spot diameter is chagned.
Figure 8C:
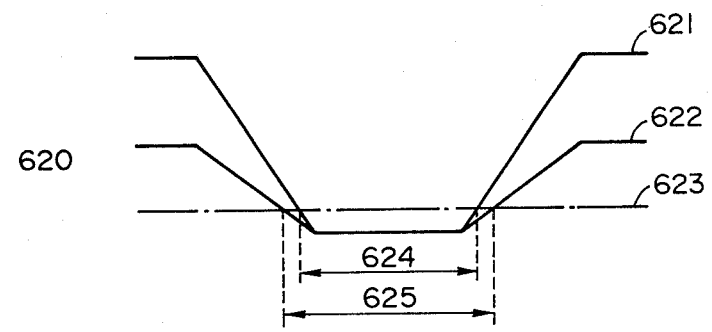
FIG. 8C shows the width of development as obtained when the light quantity of the beam is changed.

In FIG. 7C, 522 is a signal whose pulse width has been expanded by Δt relative to the inverted signal 521 by the processor shown in FIG. 7A. For the original signal 521, the laser spot along the scanning center line 535 is shown at 523 and the distribution of exposure is shown at 524 in the same manner as in FIG. 3. When the inverted signal 521 is used as a modulating signal as it is and the developing level is at 524, the line width obtainable in this case is 525. On the contrary, when the signal 522 is used as a modulating signal, the position at which the scanning spot is produced, is shifted to 532 from 531 and therefore there is obtained a distribution of exposure as indicated by solid line at 524. Thus, in the same manner as in FIG. 3, the width of line developed is broadened to 526. Let Vs denote the scanning speed of spot. Then, the length of the line segment will be lengthened by the amount of Vs·Δt so that the phenomenon of "thinning of image" can be eliminated. This means that scanning speed Vs determines the pulse width Δt required for obtaining the elongation $l=Vs·\Delta t$. As seen from FIG. 8A, the width of development is changed to 603 and further to 604 by changing the developing level to 601 and further to 602 for the exposure distribution 600 along the scanning center line 605. Therefore, the elongation l is variable also depending upon the developing level. As seen from FIG. 8B, when the diameter of scanning spot is changed from 612 to 613, the width of development is changed from 618 to 616. Therefore, l is variable also depending upon the diameter of scanning spot. Further, as shown in FIG. 8C, the width of development is changed from 624 to 625 by changing the quantity of light because the peak of exposure changes with the change of the quantity of light and therefore the distribution of exposure is changed from 621 to 622 as indicated at 620. This means that l is variable also depending upon the quantity of light. In this manner, by suitably selecting or controlling the pulse width Δt according to the scanning speed, spot diameter, developing level and the quantity of light, the unfavourable phenomenon of "thinning of image" in the process of the type by which an unexposed part is developed, can be eliminated and it is made possible to obtain high quality images even when the unexposed part developing type of process is employed.

Figure 1:
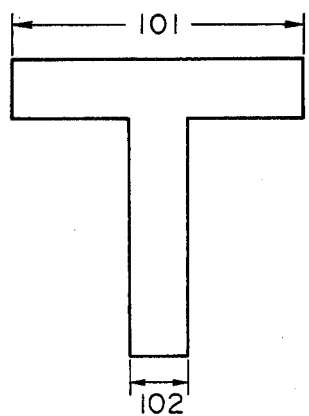
FIGS. 1, 2, 3 and 4A–4F illustrations of the phenomenon of "thinning of image"
Figure 2:
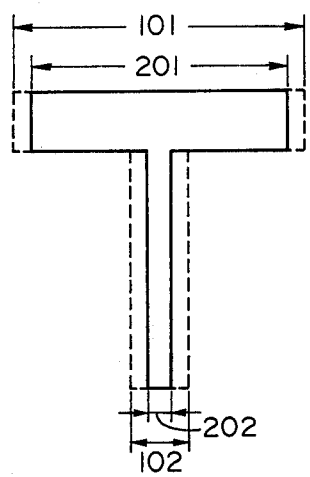

In the above embodiment, the pulse width is expanded uniformly and equally for all of the line segments. However, as another embodiment of the invention such method may be adapted so that the pulse width is selectively expanded according to the width of a line segment. From FIGS. 1 and 2 it is seen that the quality of image is reduced by the thinning effect of those line segments having short width. Therefore, the purpose of obtaining high quality characters and images can be attained by expanding the pulse width only when the width of a line segment is short.

Figure 9A:
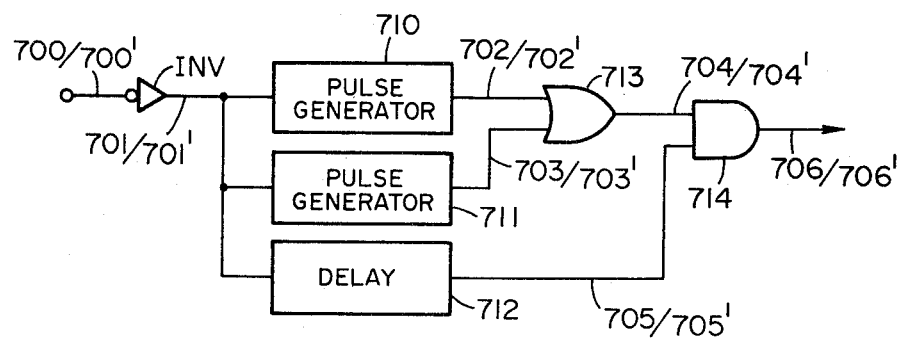
FIG. 9A is a circuit diagram showing a second embodiment of the processing circuit 10.

A processing circuit useful for this purpose is shown in FIG. 9A.

Figure 9B:
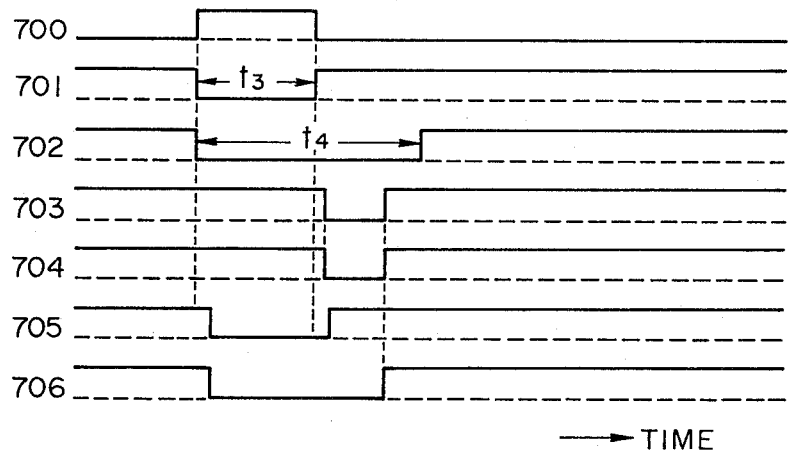
FIGS. 9B and 9C show wave-forms of signals at the respective parts thereof.
Figure 9C:
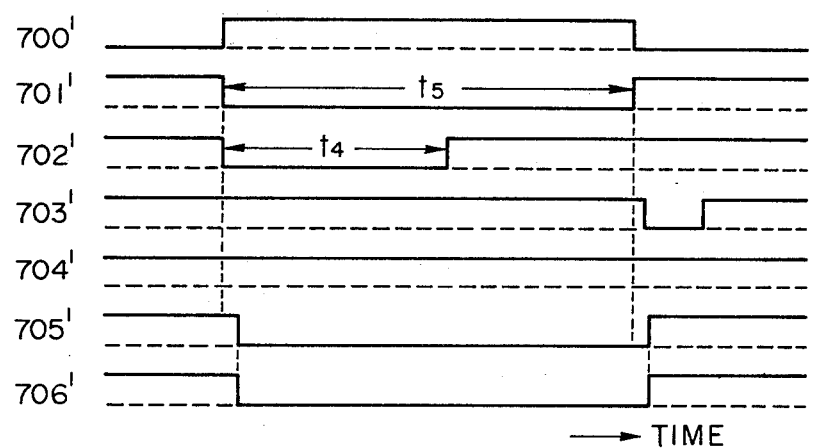

In FIG. 9A, original signal 700/700' serially put in is inverted by an inverter INV to form an inverted signal 701/701' which brings a pulse generator 710 into operation by falling of the signal 701 to form a signal 702/702'. On the other hand, the inverted signal 702/702' also brings another pulse generator 711 into operation by rising of the signal 701 to form a signal 703/703'. The output from an OR circuit 713 of the signals 702/702' and 703/703' becomes 704/704'. In case the pulse duration of the original is shorter than pulse duration t₄ (FIG. 9B), a pulse is put out from the OR circuit 713. On the contrary, in case that the pulse duration is longer than t₄ (FIG. 9C), no pulse is put out from the OR circuit 713. This signal 704/704' and the original signal passed through a delay circuit 712 are input to an AND circuit 714 which generates a new signal 706/706'. According to the sequence of FIG. 9, the pulse duration of the original signal is changed only when it is shorter than a certain determined pulse duration. When it is longer than the latter, the pulse duration of the original signal remains unchanged and a signal having the same pulse duration is obtained. By carrying out recording based on a new information signal in this manner, any reduction of image quality caused by thinning effect occurred when the pulse duration is short can be eliminated. Thus, according this embodiment, high quality images can be obtained.

Figure 10:
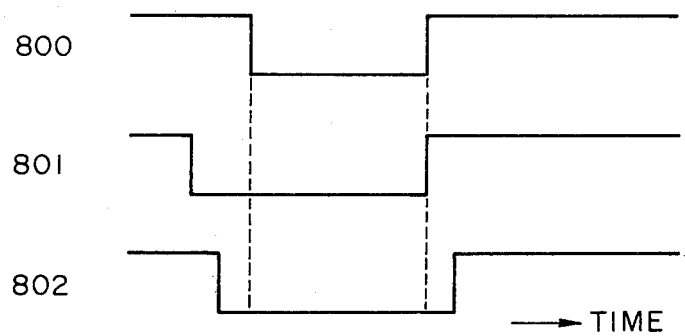
FIG. 10 shows another signal wave form.

In the shown embodiment, the width of signal has been expanded only at the end of the image production. However, it is evident that the same effect can be obtained by expanding the pulse duration forwardly of image production (801 in FIG. 10) or both directions (802) relative to the input signal 800 provided that the amount of expansion is the same.

Figure 11:
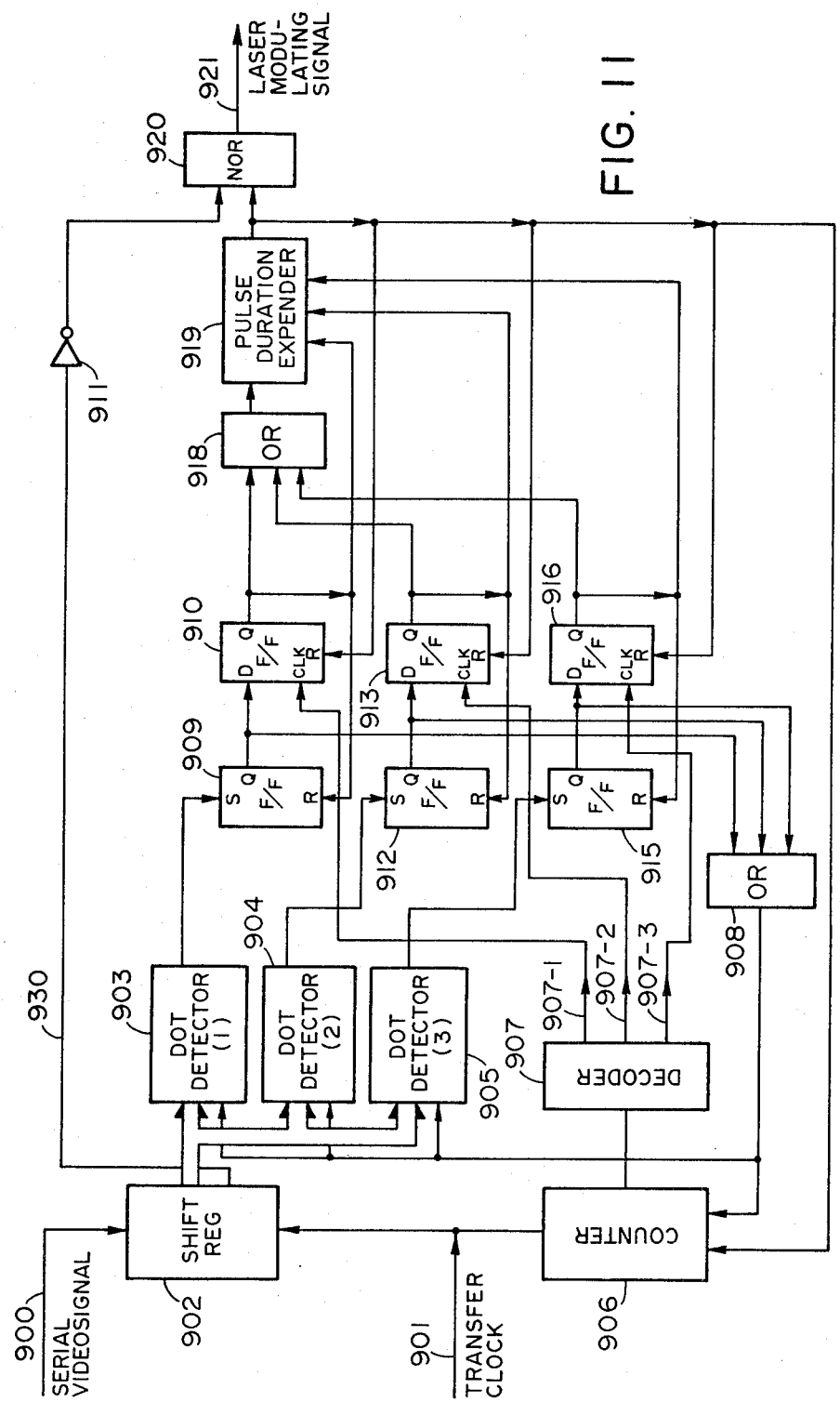
FIG. 11 is a circuit diagram showing a processing circuit for thickening the isolated black portion.
Figure 12A:
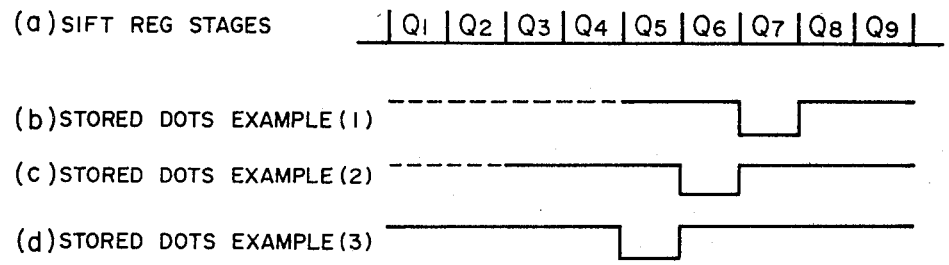
FIG. 12a shows examples of dots stored in shift register stages.
Figure 12B:
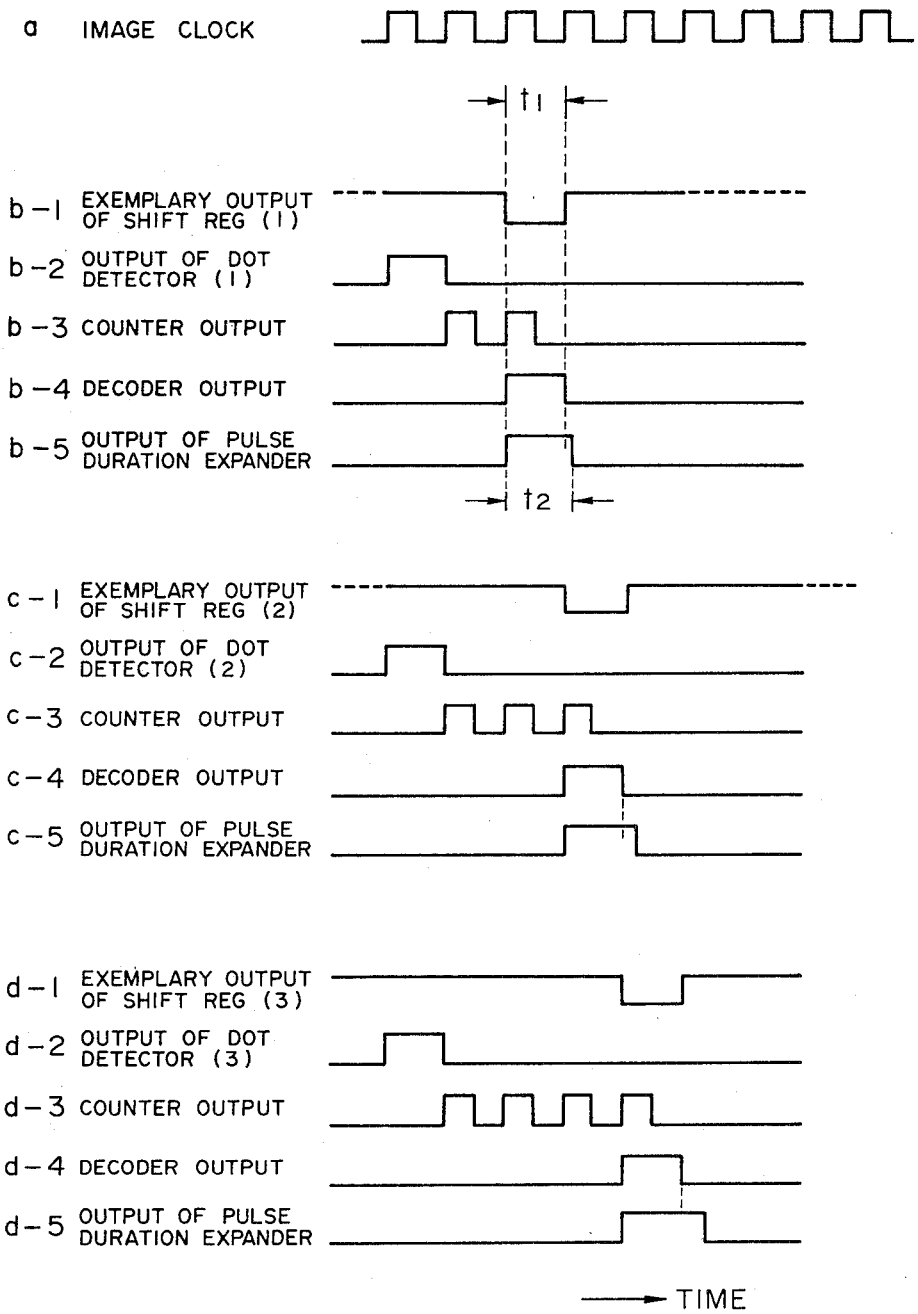
FIG. 12B is a timing chart of the respective parts of the circuit shown in FIG. 11.

FIG. 11 shows a signal processing circuit for an isolated black image or part within white background area. FIG. 12A shows examples of dots stored in the shift register 902 of the processing circuit and FIG. 12B shows a timing chart at the respective parts of the processing circuit.

In FIG. 11, the reference numeral 900 designates a video signal. 901 is a transfer clock, 902 is a 9 bit shift register, 903, 904 and 905 are dot detectors, 906 is a counter, 907 is a decoder, 908 is an OR gate, 909, 912 and 915 are flip-flops, 910, 913 and 916 are D-type flip-flops, 918 is an OR gate, 919 is a pulse duration expander, 911 is an inverter and 920 is a NOR gate.

Serial video signal 900 and video transfer clock 901 are introduced into the 9 bit shift register 902, the output of which is introduced into the dot detectors 903, 904 and 905. Of the three dot detectors, the dot detector (1) designated by 903 detects that the dot arrangement of the serial video signal has just become the arrangement of 2 dots (blank portion not to be recorded), 1 dot (portion to be recorded) and 2 dots (blank portion not to be recorded) in this order as shown in FIG. 12A-(b). This dot detector is constituted of a 5 bit (Q6-Q9) comparator. The second dot detector (2) designated by 904 detects the appearance of the dot arrangement of 3 dots: 1 dot: 3 dots as shown in FIG. 12A-(c) and the third dot detector (3) designated by 905 detects the appearance of the dot arrangement of 4 dots: 1 dot: 4 dots as shown in FIG. 12A-(d). The manner of operation thereof will be described in detail hereinafter with reference to FIGS. 12A and 12B.

Since the register 902 is of 9 bit construction, the first input serial video signal reaches the last stage of the shift register 902 when 9 pulses of video clock have been put in. Herein, the signal is referred to as Q9 and signals following it serially are referred as Q8, Q7, . . ., Q1. The arrangement of dots stored in the shift register 902 shown in FIG. 12A-(b) shows the case wherein Q9 and Q8 are a blank part, Q7 is part to be recorded and Q6 and Q5 are a blank part. Namely, it shows the appearance of the dot arrangement of 2, 1, 2. In accordance of the image clock shown in FIG. 12B-(a), this is put out in the form shown in FIG. 12B-(b)-1. Similarly, FIG. 12A (c) shows the case of the dot arrangement of 3, 1, 3 and FIG. 12A(d) shows the case of 4, 1, 4, and their outputs are shown in FIG. 12B(c)-1 and (d)-1 respectively. Those dot detectors in which the above dot arrangements of FIG. 12A(b), (c) and (d) are appearing, are indicated by 903, 904 and 905 in FIG. 11. (b)-2, (c)-2 and (d)-2 in FIG. 12B are detection signals on the dot detectors 903, 904 and 905 which are detected at the same timing as that for the output on the line 930. In FIG. 11, the detection signal of dot detector (1) 903 sets the flip-flop 909 and output signal of which is introduced into the counter 906 through OR gate 908 to open the gate of the counter. Thus, the counter starts counting the transfer clocks 901. The output of the counter 906 is put into a decoder 907. (b)-3, (c)-3 and (d)-3 in FIG. 12B show the output signals of the counter 906 which are put into the decoder 907. (b)-4 in FIG. 12B is a decoder output signal 907-1 which is issued 2 clocks after the detection signal shown in FIG. 12B(b)-2. On the other hand, the signal Q7 of the part to be recorded is shifted to Q9 2 clocks after the dot detection signal of (b)-2 in FIG. 12B so that it may be synchronized with the output signal 907-1 shown in FIG. 12B (b)-4. Again, referring to FIG. 11, the output signal of flip-flop 909 is applied to D-input terminal of D-type flip-flop 910 and the decoder output signal 907-1 is applied to its clock terminal CLK to set the flip-flop 910. The output of flip-flop 910 resets the flip-flop 909. When reset, it closes the count gate of counter 906 through OR gate 908 to inhibit the counter from counting. At the same time, the output of flip-flop 910 is introduced into pulse duration expander 919 through OR gate 918. The pulse duration expander 919 may be a monomultivibrator or counter and performs the function to expand the minimum video signal duration $t_1$ to any desired duration $t_2$. The signal is introduced into the counter 406 to clear the counted value and to reset the flip-flop 910. The output of the pulse duration expander 919 (FIG. 12B(b)-5) is also put into NOR gate 920 which is receiving the output signal Q9 from the shift register 902 at the same time. The output from the NOR gate 920 is a serial video signal which is introduced into the laser modulator. The NOR gate 920 receives, at its one input terminal, output signal delivered from shift register 902 and inverted by inverter 911, that is, a video signal not pulse-expanded and at the other input terminal an expanded video signal from the pulse duration expander. These two input signals are mixed to form a new video signal, that is, a laser modulating signal 921.

Operations of the second and third dot detectors 904 and 905 are similar to that of the above first dot detector 903 and therefore will be described hereinafter briefly.

Outputs of the dot detectors 904 and 905 set flip-flops 912 and 915 respectively to bring the counter 906 into operation and to set D-type flip-flops 913 and 916 by means of output signals 907-2 and 907-3 of the decoder 907. Outputs of the D-type flip-flops are introduced into the pulse duration expander 919 through OR gate 918 to expand the pulse duration to a desired extent. At the same time, the pulse duration expander is receiving signals from flip-flops 910, 913 and 916, and expands the pulse duration at different rates according as the difference of dot arrangement then detected.

In FIG. 12A, the signal shown in (b) gets in the output position of shift register appearing 1 clock after the signal (c). In case of (c), it is detected by the dot detector 904 and then the counter 906 starts counting. However, 1 clock after it will be in the position of signal of (b) and therefore the first dot detector 903 will be brought into operation erroneously. However, this can be prevented by the OR gate 908 for outputs from flip-flops 909, 912 and 915. Since the OR gate 908 is gating the dot detectors 903, 904 and 905, they are inhibited from detecting such position after 1 clock.

In the above embodiment, dot detectors have been shown and described to have the dot arrangements of 2, 1, 2; 3, 1, 3 and 4, 1, 4. However, it should be understood that the dot arrangements can be selected at one's will and also the number of combinations may be increased or decreased as desired.

Figure 13:
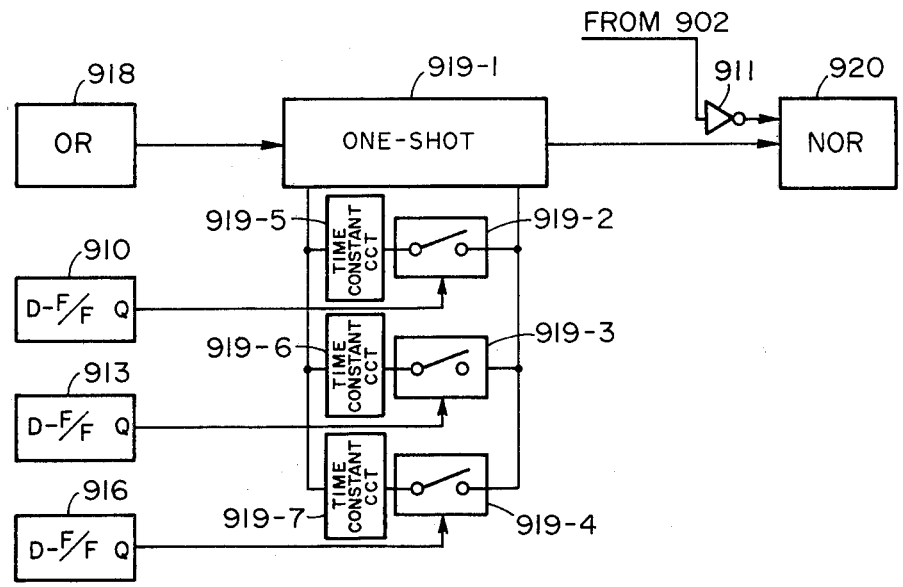
FIG. 13 shows a concrete form of the pulse duration expanding circuit 919.

FIG. 13 shows an embodiment of the pulse duration expander 919.

In FIG. 13, the reference numeral 919-1 designates a monomultivibrator. 919-2, 919-3 and 919-4 are time constant change-over switches which may be mechanical switches such as relays or semiconductor switches such as FETS. 919-5, 919-6 and 919-7 are time constant circuits whose function is to determine pulse duration.

A signal coming from flip-flop 910 is delivered to the time constant change-over switch 919-2 to close it and to select the time constant circuit 919-5. On the other hand, by the output of OR circuit 918, the mono-multivibrator 919-1 is brought into operation to make up a desired pulse duration. As for other flip-flops 913 and 916, operation is the same as above.

Now, a further concrete example will be described with reference to the case in which the laser is put on at the white part of an original image and put off at the black part thereof, and development is carried out according to the dry toner projection development system using negative toner. In this case, the phenomenon of "thinning of image" becomes more pronounced when the area of the white background part is larger. Therefore, to obtain a desired image developed correctly in size, the laser must be modulated according to the following principle:

A. Expand the isolated dot 1.1 times when the serial signal is 1, 1, 0, 1, 1.

B. Expand the isolated dot 1.2 times when the serial signal is 1, 1, 1, 0, 1, 1, 1.

C. Expand the isolated dot 1.4 times when the serial signal is 1, 1, 1, 1, 0, 1, 1, 1, 1.

D. Leave the serial signal as it is for all other cases.

To realize the above, the time constant of time constant circuit 919-5 is preset to a value 1.1 times as large as one cycle period of image transfer clock. Similarly, time constant circuit 919-6 and 919-7 are so preset as to have time constants 1.2 times and 1.4 times as large as the one cycle period of the clock respectively.

Figure 14:
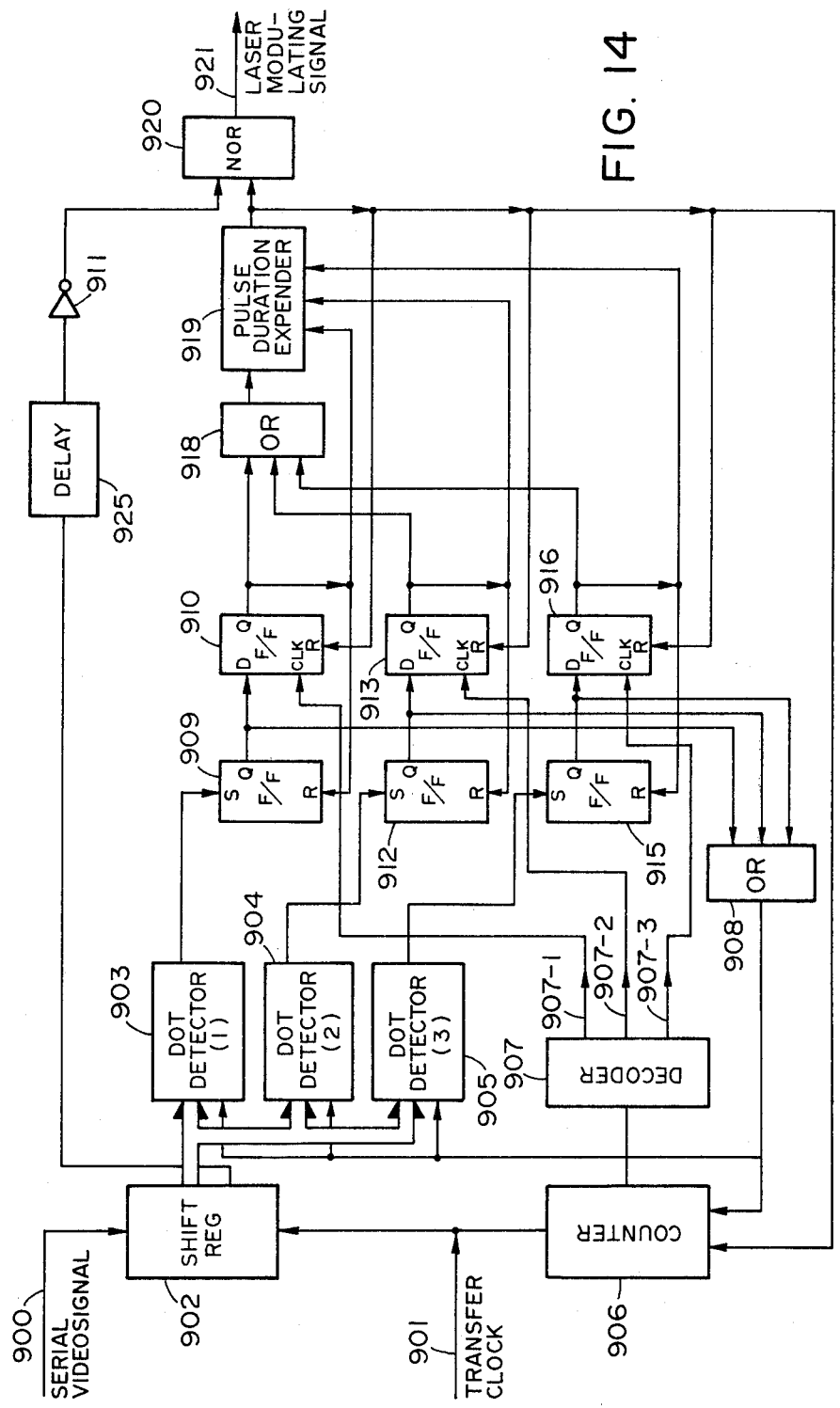
FIG. 14 shows an isolated black portion processing circuit containing a delay circuit.

When the isolated black portion is exclusively processed by the processing circuit shown in FIG. 11 to thicken that portion only, it is observed that the center position of the isolated black portion is shifted a little on the recording medium in the direction of principal scanning. However, such a shift can be prevented by delaying the output of the shift register in a manner as shown in FIG. 14. Thus, in FIG. 14 there is provided a delay circuit 925. It has been found that when the delay time of delay circuit 925 is preset to about half of the time increment given by the pulse duration expander 919, then the shift of the center of an isolated black portion can be prevented completely. Therefore, this embodiment is useful particularly when high accuracy is desired for video output signals.

Figure 15:
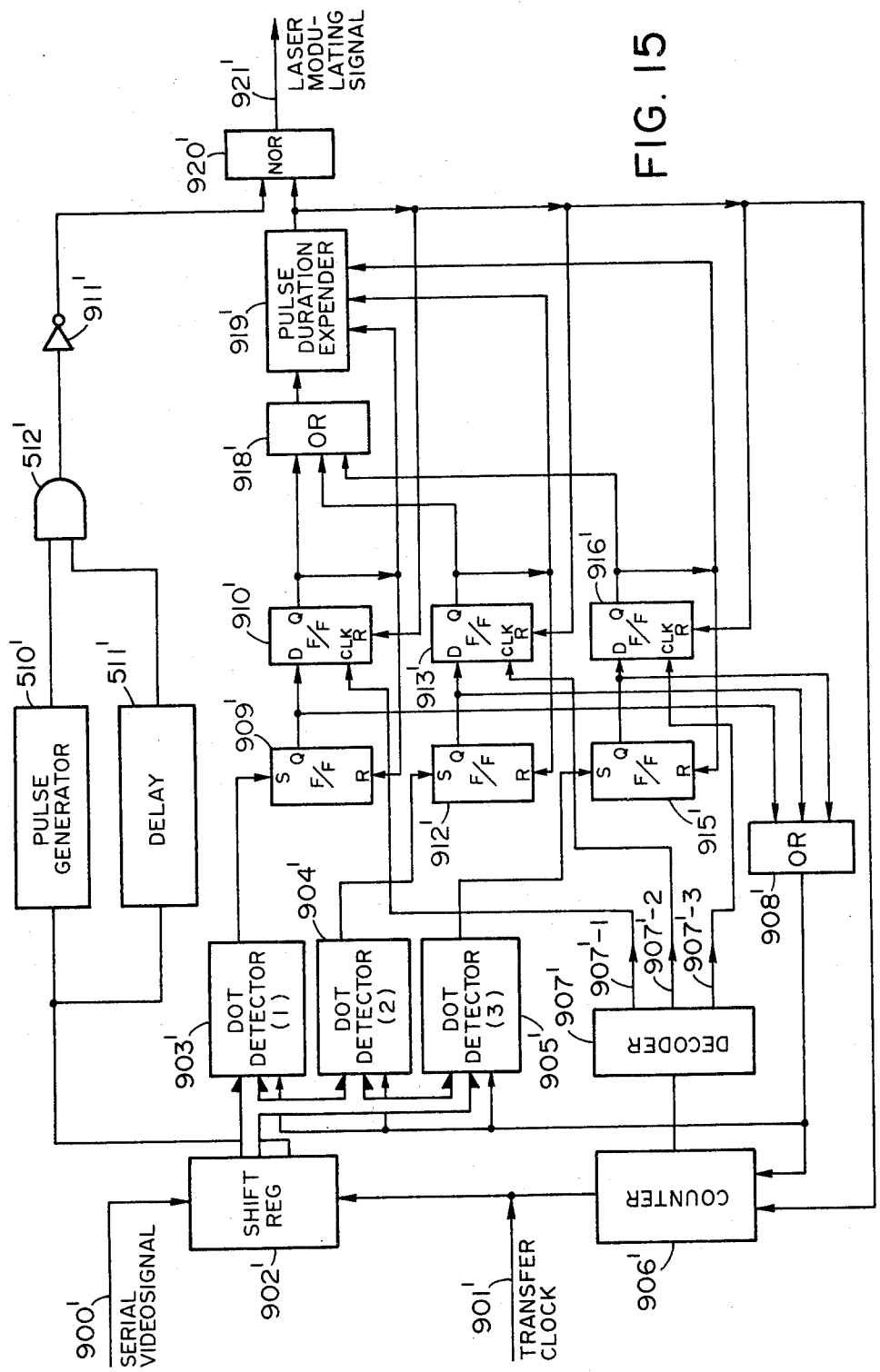
FIG. 15 is a circuit diagram showing a combination of a uniform thickening processing circuit and an isolated black portion thickening processing circuit.

FIG. 15 shows another embodiment of video signal processing circuit which is a combination of the processing circuit for uniformly thickening lines shown in FIG. 7A and the processing circuit for thickening only isolated black portions shown in FIG. 11.

In FIG. 15, those members having the same functions as in FIGS. 7A and 11 are indicated using the same reference numerals with the affix of an ",". With this embodiment, all of the black signals are extended while the isolated black portion is extended at a particularly large extension rate. This embodiment brings forth a particular advantage when the toner projection developing system is employed.

As is understood from the foregoing, the present invention produces high quality images employing a known developing system of the type by which an unexposed part is developed. The phenomenon of "thinning of image" which results in reduction of image quality is eliminated by changing the duration of an image signal so as to change the line width of a reproduced image according to the invention. In the scan type image recording apparatus, character patterns stored in the character generator need not be changed. High quality images can be obtained using simple circuits. Further, the apparatus according to the invention is able to accurately correct the errors in six of developed images caused by the difference in size of background area as well as of black part area between one image and the next image.

As described above, the black part of a latent image is characterized by more "thinning of image" when there is employed such type of process in which a non-image part is exposed to the laser, as compared with the case wherein the image part is exposed. However, even when the exposure was made according to the latter process, if the development is carried out using the system of toner projection development, then the isolated black portion becomes thinned compared with those black portions densely concentrated. An embodiment to correct this "thinning of image" will be described with reference to FIGS. 16 and 17 showing control circuits.

In FIG. 16, a laser is put on at the black part. The laser is driven lighting in a pulsated form. (a) is a serial signal and (b) is a laser driving signal. For the concentrated dot signal portion of the serial signal indicated by $a_1$, the laser is driven at the rate of 10 pulses per dot. In contrast, for the isolated dot signal portion $a_2$, it is driven at the rate of 12 pulses per dot to correct the thinning of image.

In FIG. 17, a flip-flop is designated by 919-10, a comparator by 919-11, a pulse counter by 919-12, a clock generator by 919-13, and AND circuit by 922 and an OR circuit by 940.

The clock generator 919-13 is an oscillator having a frequency N times, for example, 10 times larger than that of the image clock. The flip-flop 919-10 is set by the output from OR circuit 918 which is also put into the counter 919-12 to release it from the reset position. Thus, the counter starts counting pulses. The output from the counter is introduced into the comparator 919-11 which is receiving, at the same time, outputs from flip-flops 910, 913 and 916. Thereby, a desired numerical value M (for example, M=12 or 13) is set. Therefore, the comparator compares it with the signal coming from the counter 919 and when they get in incidence with each other the comparator resets the flip-flop 919-10. The output of the flip-flop 919-10 has its pulse duration changed differently by flip-flops 910, 913 and 916 in this manner and there is obtained a desired signal.

OR circuit 940 finds out the logical sum of the output of flip-flop 919-10 and the serial video signal and then AND circuit 922 finds out the logical product of the flip-flop output and the clock from clock generator 919-13. Thus, a laser driving signal 921' is obtained. The laser driving signal is pulsated and it has a larger number of pulses per clock at the isolated black portion than that at the concentrated black portions. Since the pulse duration per pulse is constant, the isolated portion is thickened.

While various methods for treating "thinning of image" have been described in the above, there is also the case wherein the phenomenon of "thickening of image" occurs. Namely, when a cascade developing system or a magnetic brush developing system having an edge effect is employed, images become excessively thickened. This problem of "thickening of image" is pronounced in particular at an isolated black portion of the image. In this case, therefore, it is required to thin the isolated black portion. According to the invention, this can be attained by slightly modifying the circuit shown in FIG. 11.

Figure 18:
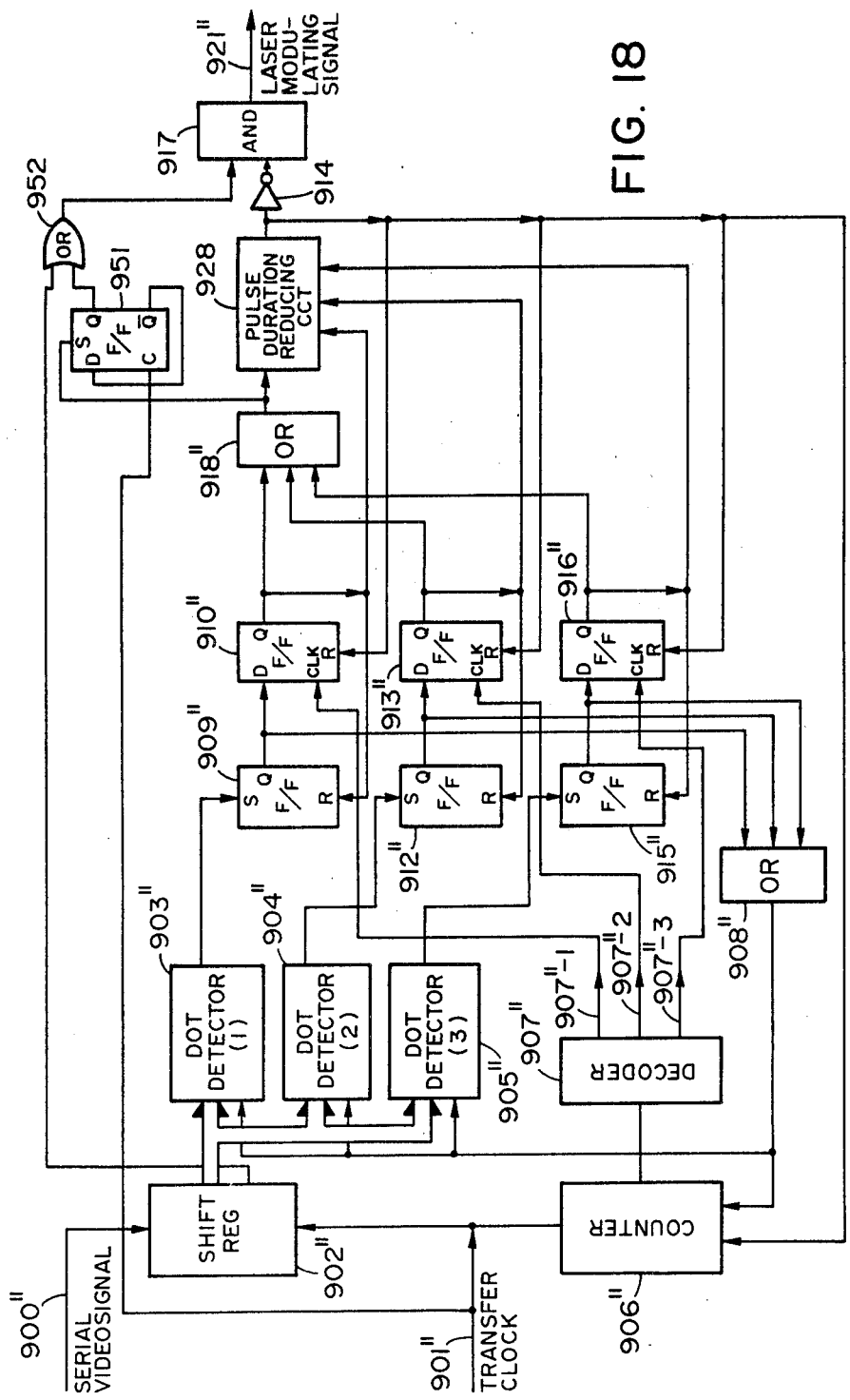
FIG. 18 is a circuit diagram showing a processing circuit for thinning the isolated black portion.
Figure 19:
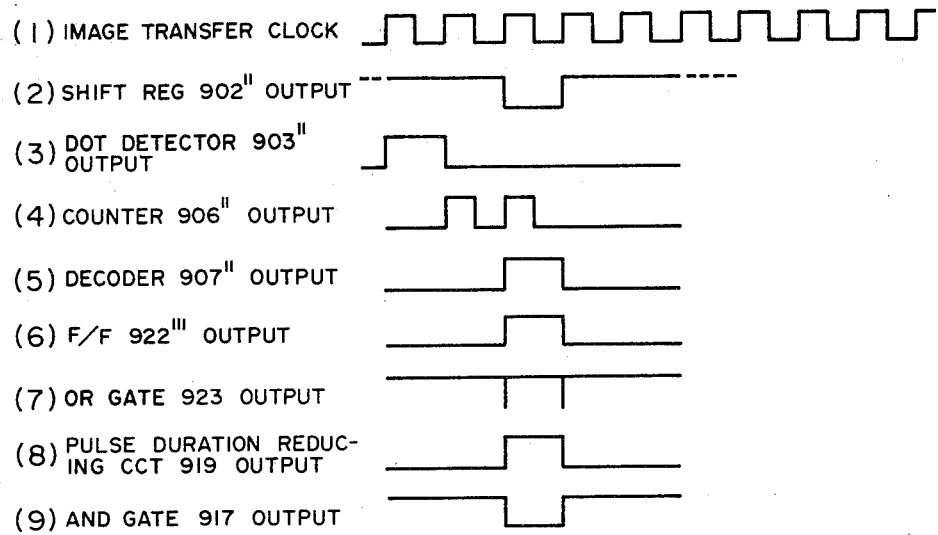
FIG. 19 is a timing chart of the respective parts thereof.

FIG. 18 shows a circuit modified to treat "thickening of image" and FIG. 19 shows a timing chart as obtained when the dot detector 903" detects concordance with dots of 2, 1, 2.

In FIG. 18, those members having the same functions as in FIG. 11 are designated using the same reference numerals with the affix of an '""'. 914 is an inverter, 917 is AND circuit, 951 is D-type flip-flop, 952 is OR circuit and 928 is a pulse duration reducing circuit.

2 clocks after the detection of concordance of dots by the first dot detector 903", an output is issued from the decoder 907". By this output, D-type flip-flop 910" is set and at the same time D-type flip-flop 951 is set through OR circuit 918". Laser lighting dot data are cancelled by OR circuit 952. Output of D-type flip-flop 910" is introduced into the pulse duration reducing circuit 908 which produces a pulse whose duration is 0.9 times as long as one clock cycle. This output from the pulse duration reducing circuit is applied to one input terminal of AND circuit 917 through inverter 914. To another input terminal of the AND circuit 917 is applied the output from OR circuit 952. The AND circuit 917 delivers a laser modulating signal 921" which has been pulse reduced as for an isolated black portion of an image. Thus, a thinning treatment is performed.

Figure 20:
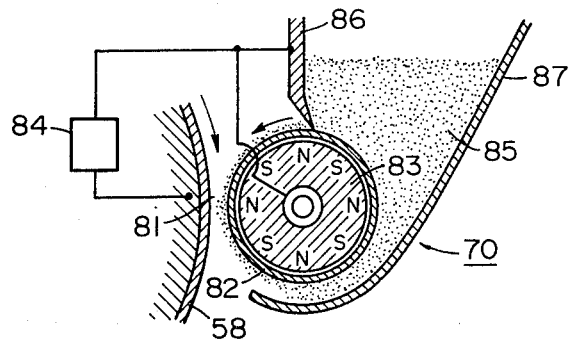
FIG. 20 shows one form of the toner projection development type of developing device.
Figure 21:
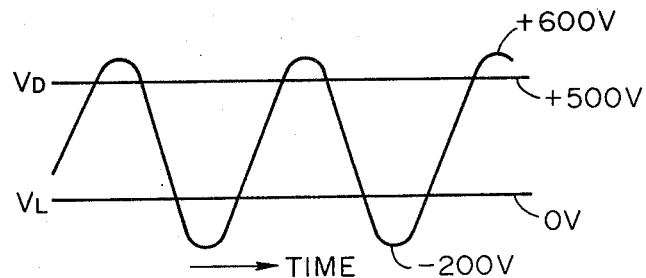
FIG. 21 is a curve showing the relation between the bias voltage at the developing device shown in FIG. 20 and the surface potential on the photosensitive medium.

Now a concrete example of the developing device 70 in FIG. 5 will be described with reference to FIGS. 20 and 21.

The developing device shown in FIG. 29 is of the toner projection development type. Designated by 58 is a photosensitive drum comprising a CdS layer and an insulating layer and having a radius of 40 mm. 82 is a non-magnetic sleeve including therein a permanent magnet 83 and having a radius of 15 mm. The two members 58 and 82 rotate in the opposite directions and at the same peripheral speed of 100 mm/sec. 85 is insulating magnetic toner which contains 60 weight percent of styrene resin, 35 weight percent of magnetite, 3 weight percent of carbon black and 2 weight percent of a negative charge controlling agent. To improve the fluidity of toner, 0.3 weight percent of colloidal silica is externally added to the toner. Toner is transported by the sleeve 82 and the thickness of toner layer to be applied onto the drum is adjusted to about 70μ by a magnetic blade 86 provided in the vicinity of the sleeve. The toner 85 is negatively charged by frictional charging owing to the friction between the toner and sleeve. 87 is a toner container. A gap of at least 200μ is maintained between the drum 58 and sleeve 82.

The members 82 and 86 are kept in an electrically conductive state and an alternating voltage is applied to the electrically conductive supporting member of the photosensitive drum 58 from a power source 84. The alternating voltage is of sinusoidal wave and its frequency is 200 Hz. Relation between voltage and potential of electrostatic image is shown in FIG. 21.

Potential of an electrostatic image is +500 V at the image part and 0 V at the non-image part and DC voltage +200 V is superposed on the sinusoidal wave of applitude 400 V (800 Vpp).

As is understood from the various embodiments of the invention described above, the present invention produces high quality images employing a known image forming process comprising the steps of forming an electrostatic latent image on a photosensitive medium by means of beam of light and visualizing the latent image by development. In this type of known image forming process, unfavourable phenomenon of "thinning of image" or "thickening of image" is caused by the difference in the type of exposure then used, namely whether the image part exposure type of the non-image part exposure type, or by the difference in the type of development then used. According to the invention, such thinning or thickening of image can be compensated for by modifying the image signal (video signal) in a simple manner. Therefore, there is no need for changing image patterns stored in a character generator or pattern generator.

While the invention has been particularly shown and described with reference to preferred embodiments thereof, it will be understood by those skilled in the art that the foregoing and other changes in form and details can be made therein without departing from the spirit and scope of the invention.

What I claim is:

1. A scanning type image recording apparatus comprising:
    means for producing a recording signal variable between a first level and a second level;
    means for forming from said recording signal a modulation signal variable between one level and a different level corresponding respectively to said first level and said second level of said recording signal, such that the width of said modulation signal at said one level is enlarged from the width of said recording signal at said first level by a predetermined width;
    beam forming means responsive to said modulation signal to emit a beam of light when said modulation signal is at said different level, and to inhibit emission of a beam of light when said modulation signal is at said one level;
    beam deflecting means for deflecting the beam of light emitted from said beam forming means;
    photosensitive means positioned to be irradiated by the beam of light deflected by said beam deflecting means; and
    developing means for developing an area on said photosensitive means which is not irradiated by the beam to be visualized.

2. An apparatus according to claim 1, wherein said beam forming means comprises semiconductor laser beam generating means.

3. Ann apparatus according to claim 1, wherein said beam forming means comprises laser beam generating means and modulating means for modulating the beam generated by said laser beam generating means.

4. An apparatus according to claim 1, further comprising latent image forming means for forming a latent image on said photosensitive means in accordance with the beam irradiation.

5. An apparatus according to claim 1, wherein said developing means comprises projection developing means for effecting a projection development with a one component toner.

6. A scanning type of image recording apparatus comprising:
    means for producing a recording signal having a first level representative of darkened parts of an image and a second level representative of non-darkened parts of the image;
    detecting means for detecting a degree by which adjacent portions of said recording signal at said first level are isolated from each other by a portion of said recording signal at said second level;
    means for forming a modulation signal from said recording signal to modify the width of said portions of said recording signal at said first level in accordance with the detection by said detecting means;
    beam forming means responsive to said modulation signal for emitting a beam of light; and
    photosensitive means positioned to be irradiated by the beam of light emitted by said beam forming means.

7. An apparatus according to claim 6, wherein said detecting means continuously detects said recording signals produced by said producing means during a predetermined time period.

8. An apparatus according to claim 6, wherein said detecting means comprises signal storage means for storing a predetermined number of portions of said recording signal, and discriminating means for discriminating the degree of said isolation of said portions of said recording signal at said first level stored in said storage means.

9. An apparatus according to claim 8, wherein said beam forming means emits a beam of light in accordance with said modulation signal when at said portion of said recording signal at said second level.

10. An apparatus according to claim 6, wherein said detecting means comprises discriminating means for discriminating a degree of isolation.

11. An apparatus according to claim 10, wherein said modulation signal forming means comprises means for determining the modification of width of said portions of said recording signal at said first level in accordance with the output of said discriminating means.

12. An apparatus according to claim 11, wherein said determining means comprises signal delay means.

13. An apparatus according to claim 6, wherein said modulation signal forming means comrpises varying means for varying the width of said modulation signal, said varying means varying the width of said modulation signal to a greater degree the greater the degree of isolation of adjacent portions of said recording signal at said first level from each other by a portion of said recording signal at said second level.

14. A scanning type image recording apparatus comprising:

means for producing a recording signal comprising pulse signals variable between a first level representative of darkened parts of an image and a second level representative of non-darkened parts of the image;

driving pulse generating means for generating a driving pulse train having a predetermined frequency which is selected such that the period of each driving pulse is shorter than the period of the one of said pulse signals having the shortest period;

means for detecting a degree by which adjacent pulse signals of said recording signal at said first level are isolated from each other by pulse signals of said recording signal at said second level;

driving pulse signal forming means for forming a plurality of driving pulse signals from said driving pulse train, said plurality being greater in number than the number of pulse signals corresponding to said one level in accordance with the detection of the degree of isolation detected by said detecting means;

beam generating means responsive to said driving pulse signals formed by said driving pulse signal forming means for generating a beam of light; and photosensitive means positioned to be irradiated by the beam of light generated by said beam generating means.

15. A scanning type image recording apparatus comprising:

means for producing a recording signal variable between a first level and a second level;

means for forming from said recording signal a modulation signal variable between one level and a different level corresponding to said first level and said second level of said recording signal such that the width of said modulation signal at said one level is enlarged from the width of said recording signal at said first level by a predetermined width;

beam forming means responsive to said modulation signal to emit a beam of light;

beam deflecting means for deflecting the beam of light emitted from said beam forming means;

photosensitive means positioned to be irradiated by the beam of light deflected by said beam deflecting means, to form a latent image thereon in accordance with the beam irradiation; and developing means for developing the latent image on said photosensitive means to be visualized.

* * * * *

UNITED STATES PATENT AND TRADEMARK OFFICE
CERTIFICATE OF CORRECTION

PATENT NO. : 4,387,983

DATED : June 14, 1983

INVENTOR(S) : KOICHI MASEGI

Page 1 of 4

It is certified that error appears in the above-identified patent and that said Letters Patent is hereby corrected as shown below:

Column 1

Line 57, change "not" to --now--.

Column 2

Line 16, change "pont" to --point--.

Line 30, change "location" to --locations--.

Line 39, between "which" and "unexposed", insert --an--, and change "an part" to --part--.

Column 3

Line 36, between "with" and "decrease", insert --a--.

Line 59, between "4F" and "illustrations", insert --are--.

UNITED STATES PATENT AND TRADEMARK OFFICE
CERTIFICATE OF CORRECTION

PATENT NO. : 4,387,983

DATED : June 14, 1983

INVENTOR(S) : KOICHI MASEGI

It is certified that error appears in the above-identified patent and that said Letters Patent is hereby corrected as shown below:

Column 4

Line 7, change "chagned" to --changed--.

Line 46, change "of" to --to--.

Line 63, between "each" and "the", first occurrence, insert --of--, and change "area" to --areas--.

Column 6

Line 56, delete "of", and between "types" and "processes", insert --of--.

Column 9

Line 16, change "of" to --with--,

Line 29, change "and output" to --the output--.

Column 10

Line 13, change "according as" to --according to--.

UNITED STATES PATENT AND TRADEMARK OFFICE
CERTIFICATE OF CORRECTION

PATENT NO. : 4,387,983

DATED : June 14, 1983

INVENTOR(S) : KOICHI MASEGI

It is certified that error appears in the above-identified patent and that said Letters Patent is hereby corrected as shown below:

Column 11

Line 26, "an "," " should read --an " ' ".

Line 44, change "of" to --of the--.

Column 12

Line 3, change "and" to --an--.

Column 13

Line 4, change "29" to --20--.

Line 35, change "applitude" to --amplitude--.

Line 41, change "of beam" to --of a beam--.

Column 14, line 22
Claim 3, line 1

Change "Ann" to --An--.

Column 16, line 28
Claim 15, line 15

After "means;" insert --and--.

UNITED STATES PATENT AND TRADEMARK OFFICE
CERTIFICATE OF CORRECTION

PATENT NO. : 4,387,983  
DATED : June 14, 1983  
INVENTOR(S) : KOICHI MASEGI

Page 4 of 4

It is certified that error appears in the above-identified patent and that said Letters Patent is hereby corrected as shown below:

Column 16, line 31
Claim 15, line 18

Change "a latent" to --an--.

Signed and Sealed this

Tenth Day of July 1984

|SEAL|

Attest:

GERALD J. MOSSINGHOFF

Attesting Officer

Commissioner of Patents and Trademarks